United States Patent
Hirayama et al.

(10) Patent No.: US 9,110,615 B2
(45) Date of Patent: Aug. 18, 2015

(54) POINT OF SALE CONTROL DEVICE, CONTROL METHOD, AND STORAGE MEDIUM STORING A PROGRAM FOR A POINT OF SALE DEVICE

(75) Inventors: Hisashi Hirayama, Ueda (JP); Masatoshi Nakazawa, Ueda (JP); Etsuro Furuta, Ueda (JP); Kei Jintsugawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 239 days.

(21) Appl. No.: 13/561,605

(22) Filed: Jul. 30, 2012

(65) Prior Publication Data
US 2013/0033720 A1    Feb. 7, 2013

(30) Foreign Application Priority Data

Aug. 3, 2011 (JP) ................................ 2011-170222
Sep. 8, 2011 (JP) ................................ 2011-195746

(51) Int. Cl.
*G06F 3/12* (2006.01)
*G07G 1/00* (2006.01)

(52) U.S. Cl.
CPC ............ *G06F 3/1245* (2013.01); *G06F 3/1206* (2013.01); *G06F 3/1284* (2013.01); *G07G 1/0009* (2013.01)

(58) Field of Classification Search
CPC ... G07G 1/0009; G06F 3/1206; G06F 3/1245; G06F 3/1284
USPC ........................................................ 358/1.15
See application file for complete search history.

(56) References Cited

U.S. PATENT DOCUMENTS

| 5,940,845 | A  | * | 8/1999  | Prager et al. ................. 715/210 |
| 6,108,717 | A  |   | 8/2000  | Kimura et al.                           |
| 6,292,849 | B1 |   | 9/2001  | Kimura et al.                           |
| 6,304,922 | B2 |   | 10/2001 | Kimura et al.                           |
| 6,305,007 | B1 |   | 10/2001 | Mintz                                   |
| 6,678,742 | B1 |   | 1/2004  | Muramatsu et al.                        |
| 2001/0035971 | A1 |   | 11/2001 | Koakutsu et al.                      |
| 2002/0095495 | A1 |   | 7/2002  | Otsuka et al.                        |
| 2002/0194073 | A1 |   | 12/2002 | Otsuka et al.                        |
| 2003/0061021 | A1 | * | 3/2003  | Sakai et al. ....................... 704/1 |
| 2007/0019222 | A1 |   | 1/2007  | Oda et al.                           |
| 2009/0037940 | A1 | * | 2/2009  | Ng et al. ....................... 719/327 |
| 2010/0328694 | A1 |   | 12/2010 | Horiuchi et al.                      |
| 2011/0122438 | A1 |   | 5/2011  | Someya et al.                        |
| 2011/0255108 | A1 | * | 10/2011 | Fay et al. .................... 358/1.11 |

FOREIGN PATENT DOCUMENTS

| JP | 7-325808 A | 12/1995 |
| JP | 09-097141 A | 4/1997 |

(Continued)

*Primary Examiner* — Fred Guillermety
(74) *Attorney, Agent, or Firm* — Kilpatrick Townsend & Stockton LLP

(57) ABSTRACT

The effort required to develop a device object is reduced. A host computer 10 has objects including a printer CO 21 that provides a POS application program 11 with an interface for each type of device, and a printer SO 22 that provides the printer CO 21 with an interface to each device type and executes a process by device unit. A wrapper SO 30 executes the process instead of the printer SO 22 when at least one of the methods called by the printer CO 21 is called, and then calls a method of the printer SO 22 based on the result of the executed process. When the printer CO 21 calls other methods, the wrapper SO 30 calls the printer SO 22 method.

16 Claims, 7 Drawing Sheets

(56) References Cited

FOREIGN PATENT DOCUMENTS

| | | |
|---|---|---|
| JP | 9-106355 A | 4/1997 |
| JP | 2000-293375 A | 10/2000 |
| JP | 2002-200796 A | 7/2002 |
| JP | 2002-202892 A | 7/2002 |
| JP | 2002-215477 A | 8/2002 |
| JP | 2002-264424 A | 9/2002 |
| JP | 2002-318703 A | 10/2002 |
| JP | 2003-535383 A | 11/2003 |
| JP | 2004-265136 A | 9/2004 |
| JP | 2004-318523 A | 11/2004 |
| JP | 2007/26353 A | 2/2007 |
| JP | 2007-052563 A | 3/2007 |
| JP | 2009-140063 A | 6/2009 |
| JP | 2011-8661 A | 1/2011 |
| JP | 2011-011416 A | 1/2011 |
| JP | 2011-108171 A | 6/2011 |

* cited by examiner

POINT OF SALE CONTROL DEVICE, CONTROL METHOD, AND STORAGE MEDIUM STORING A PROGRAM FOR A POINT OF SALE DEVICE

This application claims priority under 35 U.S.C. §119 to Japanese Patent Application Nos: 2011-170222 filed on Aug. 3, 2011 and 2011-195746 filed on Sep. 8, 2011, the entire disclosure of which are expressly incorporated by reference herein.

BACKGROUND

1. Technical Field

The present invention relates to a control device, control method, and storage medium storing a program that controls a device such as a printer.

2. Related Art

Component-based programs and software ("objects" below) written in object-oriented programming languages are known from the literature. Objects are reusable software constructions that operate under a particular operating system. A wide variety of systems have been developed using objects. Operating systems (OS) built on the .NET Framework provided by Microsoft® provide an environment in which client application programs (container applications) can use objects, and have a wide range of functions enabling objects to be used.

One example of a system that uses objects is a POS (point-of-sale) system. A POS system is a system constructed with a variety of different peripheral devices, and typically has a display, printer, and input devices such as a scanner, cash drawer, and card reader, connected to a personal computer or other host computer. See, for example, Japanese Unexamined Patent Appl. Pub. JP-A-H09-106355. JP-A-H09-106355 describes a personal computer-based POS system constructed using objects.

A distributed object POS system includes a POS application program and objects for peripherals (devices) such as printers, scanners, and cash drawers provided by different manufacturers. A device object includes a control object provided for a specific type of device (device class), and a service object provided for a particular device. For example, when the POS application program outputs data to a printer, the data is passed to the control object (CO) for the printer, passed to the service object (SO) corresponding to the manufacturer and model of the output printer, and the data is passed to the printer through the input/output interface of the OS.

Detailed specifications are defined for each peripheral device class, and a control object is constructed according to a particular specification such as the OPOS (OLE for Retail POS) standard, for example, but the service object is developed according to the specifications defined by the manufacturer for individual devices.

A detailed standard is thus defined for each peripheral device class, and the control object is constructed according to a particular standard such as the OPOS standard. Service objects, however, are developed for a specific device by the manufacturer according to the specifications of the device. As a result, when the specifications of a device such as a printer are changed, and when a new model is developed, a service object must be developed for the modified or new device. However, as devices gain more functions, the control object must call more methods, and developing a new service object to be compatible with all methods requires significant effort.

A first object of the present invention is therefore to reduce the effort required to develop device objects such as service objects for use in a device control program.

In addition, output devices such as printers connected to a host computer store data for plural font patterns (font data) for compatibility with the character codes outputs from the host computer. Such output devices store a character code set, which is a single unit of a specific number of character codes for a specific language, for each language the output device can handle. The printer is told whether the character code set for German, Italian, or other language, for example, is to be used by a command from the host computer or a configuration switch on the printer. When data (character code) specifying a particular character in the specified character code set is input from the host computer, the corresponding font pattern data is read from memory and the character is recorded on the recording medium by driving a recording head, for example.

Modern host computer operating systems may also use a universal character code set. A universal character code set such as Unicode contains character codes for plural languages in a single unified character code system (a single character code set). Universal character code sets are increasingly common because the characters that an application program can use are not limited to any particular language if the operating system also uses the universal character code set. Japanese Unexamined Patent Appl. Pub. JP-A-2011-8661, for example, describes a method whereby the host computer, for example, uses a map file to map the character codes of the universal character code set character by character to the font pattern data built into the output device in order to make an output device that has plural character code sets built in compatible with a universal character code set.

Some output devices, however, only have font pattern data for the character code sets of some languages in the universal character code set. The host computer must therefore convert character codes using a device driver or other program in order to control such output devices. More specifically, the character codes of the specific character code set (such as Unicode) that are output by the application program run by the host computer must be converted to character codes in the character code set that the output device can understand. This conversion process is typically performed by the device driver. However, the language used by the device driver and the language used by the output device must be the same in order for the device driver to execute the conversion process. The conversion process may therefore not be executed normally depending upon the languages of the device driver and output device. Managing the language compatibility of the device driver and output devices is also complicated.

A second object of the present invention is therefore to enable the output device to correctly output the data output by the application program, and to simplify managing output devices and the means of controlling output devices.

SUMMARY

One aspect of the invention is a control device that can execute an application program and control at least one type of device, including: a first object that provides the application program with a first interface for each type of device; a second object that provides the first object with a second interface for each type of device, and executes a process by device unit; and a third object that executes the process instead of the second object when at least one of the second object methods that are called by the first object is called by the first object, and calls the method of the second object when another method is called by the first object.

When a method is called by the first object based on data output by the application program, the control device in this aspect of the invention executes a process of at least one method with the third object instead of the second object. As a result, the process can be executed by the third object when the called method is a method with which the second object is not compatible, and an error will not occur. More specifically, when the second object is not compatible with all methods called by the first object, the third object can compensate for the function the second object lacks. The function of the second object can therefore be easily changed or extended. The second object therefore does not need to be completely rewritten when device specifications are changed or a new device model is developed, existing second object software assets can be used, and the work related to object development can be reduced.

In a control device according to another aspect of the invention, the third object resides between the second interface provided by the second object and the first object, and when the other method is called by the first object calls the method of the second object through the second interface.

This aspect of the invention can compensate for second object functions with the third object without affecting the configuration of the second object or the first object. Existing software assets related to service objects can therefore be used, and the work related to object development can be reduced.

In a control device according to another aspect of the invention, the first object is a control object that is provided for each type of device, and the second object is a service object that is provided for each device.

This aspect of the invention compensates for service object functions with the third object, and can provide methods called by the control object. The service object therefore does not need to be completely rewritten when device specifications are changed or a new model of device is developed, and compatibility with control object can be maintained. Existing software assets related to service objects can therefore be used, and the work related to object development can be reduced.

In a control device according to another aspect of the invention the application program is a POS application program; the devices include a printer; the first object and second object are objects that control the printer according to requests from the POS application program; and the third object executes a process that converts from a specific character code set to another character code set compatible with the printer when the first object calls a print method of the specific character code set, and calls a print method of the second object based on the character code set resulting from conversion.

This aspect of the invention can execute a character code conversion process using the third object. Character codes can therefore be converted when the second object does not have a character code conversion function, and when the second object is not compatible with the character code set to be converted. The method called by the first object can therefore be completed even when the second object is lacking complete functionality.

In a control device according to another aspect of the invention, the specific character code set is written in Unicode, and the other character code set is written with 1-byte or 2-byte character codes.

When characters identified by Unicode code points are output from the application, this aspect of the invention enables printing with printers that are not Unicode compatible and print using byte codes (1-byte or 2-byte character codes). More specifically, because the third object executes a process that converts Unicode code points to byte codes, printing is possible even when the second object is not Unicode compatible.

In a control device according to another aspect of the invention, the first object is an OPOS standard control object; the second object provides an IDispatch interface as the interface to the first object; and the third object provides an IDispatch interface to the first object and calls a method of the second object through the IDispatch interface of the second object.

This aspect of the invention enables complementing the functions of an OPOS standard service object without affecting the OPOS control object.

In a control device according to another aspect of the invention, the devices include an output device that is controlled by the control device; the first object is a common control means that outputs output data common to plural types of output devices based on data output by the application program; the second object is a character data generating means that generates character data in a character set stored internally by the output device based on a character code of a specific character code set contained in the output data; and the third object is a character code conversion means that resides between the common control means and the character data generating means, and when the internal character set of the output device is another character code set that differs from the specific character code set, converts character codes in the specific character code set contained in the output data to character codes in the other character code set, and outputs to the character data generating means.

The first object in this aspect of the invention generates output data common to plural types of output devices based on data output by the application program, and the second object generates character data in the character set stored internally by the output device. When the character code set used in the output data is incompatible with the character set built into the output device in this configuration, the third object converts the character codes. As a result, when the character code sets of the output data and the character set built into the output device do not match, and the second object does not have a function for converting between these character code sets, the conversion can be processed by a function of the third object. For example, the character code sets of the output data and the output device can be extended or changed without changing the configuration of the second object of the control device. The problem of managing the character code sets of the control device and the output device can therefore be eliminated. The data output by the application program can also be output correctly by the output device. In addition, a configuration that converts character codes using the third object require little data because the specifications of the first object are not changed and the character code sets with which the output device are compatible are not increased. The utility of the output data is also not impaired because there is no need to change the output data to match the output device.

In a control device according to another aspect of the invention, the output device is a printer; the character set stored internally by the printer is composed of font data that is specified by character codes on a plurality of code pages for printing with a recording head; and the character data generating means generates and outputs character codes on the appropriate code page to the printer based on character codes in the specific character code set or character codes in the other character code set.

This aspect of the invention enables the printer to record using built-in font data because the character codes and a character code set corresponding to the character codes on a code page built into the printer are sent from the control device to the printer. Various printers can therefore be used by using the third object.

In a control device according to another aspect of the invention, the character data generating means has a conversion process means that, based on the language setting of the operating setting, converts character codes in the specific character code set contained in the output data output by the common control means to character codes in the character code set corresponding to the set language.

When the language of the operating system and the language of the character set used by the output device are the same, this aspect of the invention can convert the character codes in the output data with a quick and simple process.

In a control device according to another aspect of the invention, the character code conversion means converts character codes in the other character code set to data in a format that is not converted by the conversion process means, and outputs to the character data generating means; and the character data generating means executes a process that restores data input from the character code conversion means to character codes in the other character code set.

This aspect of the invention can prevent mistaken conversion to an incompatible character code set when the character code set of the character codes contained in the output data and the character code set of the code page built into the output device are different.

In a control device according to another aspect of the invention, the common control means is a host driver that executes a method called by the application program, processes data output from the application program, and generates data containing a character code in a common character code set and an output command that can be used in common by a plurality of device types; and the character data generating means is a client driver that generates character data in a character set stored internally by the output device based on character codes in the specific character code set contained in data generated by the host driver.

The character data generating means in this aspect of the invention processes data between the host driver that is called by the application program and the client driver that controls the output device based on data processed by the host driver. Correct character data can therefore be output to the output device without impairing the utility of the host driver and without modifying the client driver for compatibility with the output device.

Another aspect of the invention is a method of controlling a device with a control device that executes an application program and can control at least one type of device, the control method including: a first step that calls a method based on data output by the application program through a first object that provides the application program with a first interface for each type of device; a second step that executes a process by device unit through a second object that provides the first object with a second interface for each type of device; and a third step that, when at least one of the second object methods that are called by the first object is called by the first object, executes the process through a third object instead of the second object, and when another method is called by the first object, calls the method of the second object through the third object.

By executing the control method of this aspect of the invention, the control device runs an application program, and when a method is called by the first object based on data output by the application program, the control device executes a process of at least one method with the third object instead of the second object. As a result, the process can be executed by the third object when the called method is a method with which the second object is not compatible, and an error will not occur. More specifically, when the second object is not compatible with all methods called by the first object, the third object can compensate for the function the second object lacks. The function of the second object can therefore be easily changed or extended. The second object therefore does not need to be completely rewritten when device specifications are changed or a new device model is developed, existing second object software assets can be used, and the work related to object development can be reduced.

In a control method according to another aspect of the invention, the first step outputs output data common to plural types of devices based on data output by the application program; the second step generates character data in a character set stored internally by the device based on a character code in a specific character code set contained in the output data; and the third step is a step that resides between the first step and the second step, and when the internal character set of the device is another character code set that differs from the specific character code set, converts a character code in the specific character code set contained in the output data to a character code in the other character code set.

By executing the control method according to this aspect of the invention, output data is generated and output to a device based on data output by an application program. The character codes of a specific character code set contained in the output data are converted to the character codes of a different character code set in this process. As a result, character codes converted to match the device can be output when the specific character code set of the output data and the character code set of the device differ. By converting character codes in the third step, the control device can also output correct character data to the device without changing the content of the process performed in the second step. The need to manage the character code set of the device can therefore also be eliminated. Less data is therefore needed and correct character data can be output easily compared with when the device must be modified and the compatible character code set expanded.

Another aspect of the invention is a storage medium that stores a program causing a computer that can control at least one type of device to execute an object that provides an interface to an application program, the program causing the computer to function as: a first object that provides the application program with a first interface for each type of device; a second object that provides the first object with a second interface for each type of device, and executes a process by device unit; and a third object that executes the process instead of the second object and calls a method of the second object based on the result of executing the process when at least one of the second object methods that are called by the first object is called by the first object, and calls the method of the second object when another method is called by the first object.

As a result of the computer executing the program according to this aspect of the invention, when a method is called by the first object based on data output by the application program executed by the computer, the third object executes a process of at least one method instead of the second object. As a result, the process can be executed by the third object when the called method is a method with which the second object is not compatible, and an error will not occur. More specifically, when the second object is not compatible with all methods called by the first object, the third object can compensate for the function the second object lacks. The function of the second object can therefore be easily changed or extended. The second object therefore does not need to be completely rewritten when device specifications are changed or a new device model is developed, existing second object software assets can be used, and the work related to object development can be reduced.

The invention can also be embodied as a storage medium that stores the above program.

Another aspect of the invention is a storage medium storing the above program wherein: the first object outputs output data common to plural types of devices based on data output by the application program; the second object generates character data in a character set stored internally by the device based on a character code in a specific character code set contained in the output data; and the third object resides between the first object and the second object, and when the internal character set of the device is another character code set that differs from the specific character code set, converts a character code in the specific character code set contained in the output data to a character code in the other character code set, and outputs to the second object.

By the computer executing the program according to this aspect of the invention, output data is generated and output to a device based on data output by an application program run by the computer. The character codes of a specific character code set contained in the output data are converted to the character codes of a different character code set in this process. As a result, character codes converted to match the device can be output when the specific character code set of the output data and the character code set of the device differ. By converting character codes with the third object, correct character data can be output to the device without changing the configuration of the second object. The need to manage the character code set of the device can therefore also be eliminated. Less data is therefore needed and correct character data can be output easily compared with when the device must be modified and the compatible character code set expanded.

EFFECT OF THE INVENTION

When the specifications of a device are changed or a new model of device is developed, the invention enables using existing assets to construct a required system with a control device that controls devices based on data output by an application program without developing entirely new objects.

The invention therefore eliminates the need to manage the character code sets of the output device and the means of controlling the output device, and can more accurately output data output by the application program to the output device.

Other objects and attainments together with a fuller understanding of the invention will become apparent and appreciated by referring to the following description and claims taken in conjunction with the accompanying drawings.

DESCRIPTION OF EMBODIMENTS

Embodiment 1

A preferred embodiment of the present invention is described below with reference to the accompanying figures.

Figure 1:
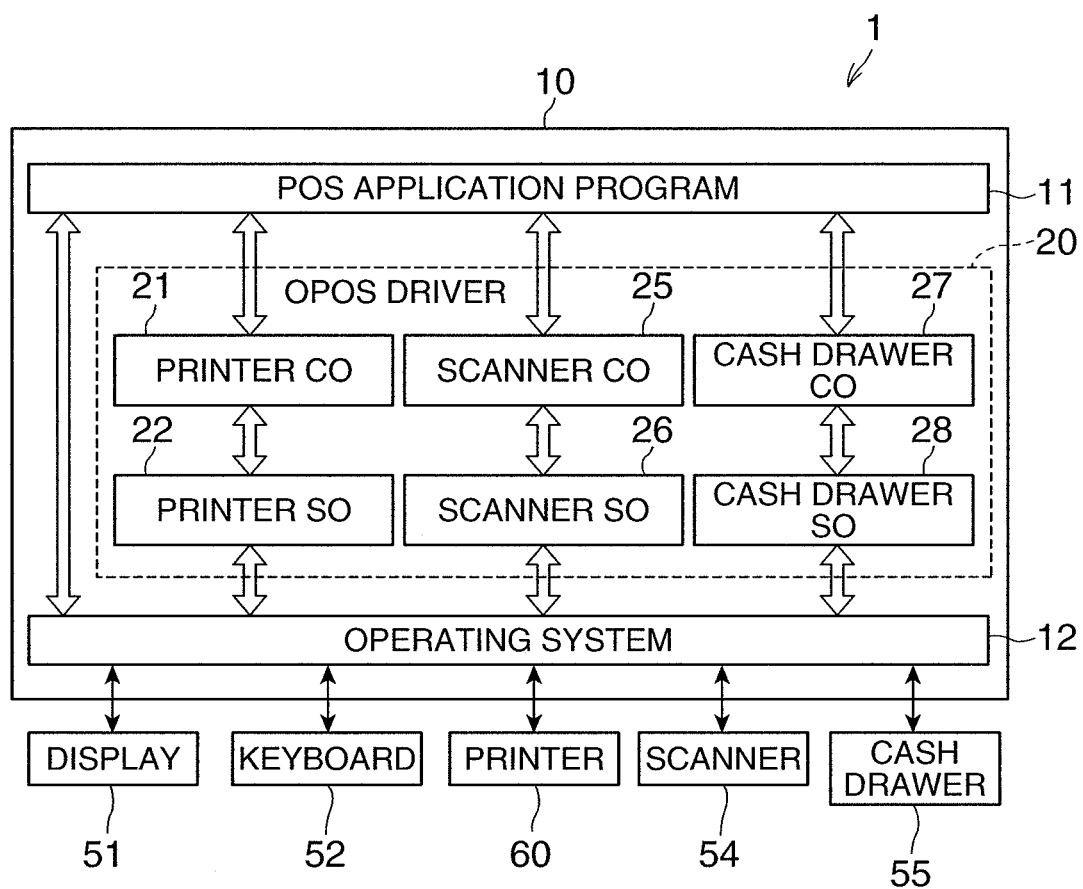
FIG. 1 is a block diagram showing the functional configuration of a POS system according to a preferred embodiment of the invention.

FIG. 1 is a block diagram showing the basic configuration of a POS system 1 according to a preferred embodiment of the invention.

The POS system 1 has a host computer 10 (control device) that is connected through a communication line to a POS server not shown. Connected to the host computer 10 are devices such as a display 51, keyboard 52, printer 60, scanner 54, and cash drawer 55.

The host computer 10 is located with the printer 60 near where a user transaction process is completed in a supermarket or convenience store, for example. The host computer 10 produces a receipt based on input information related to purchased products input by the operator. The printer 60 is a local printer directly connected to the host computer 10. The printer 60 is connected wirelessly or by wire through an interface to the host computer 10. FIG. 1 shows an example in which the printer 60 and host computer 10 are connected by wire through a connector.

The host computer 10 controls one or a plurality of printers 60 to print receipts, coupons that are given to the customer, or order tickets in a restaurant kitchen, for example. Each printer 60 then prints a receipt or ticket based on the print data generated by the host computer 10.

The host computer 10 has a keyboard 52 and scanner 54 as input devices for entering product sale information. Input from the keyboard 52 and the results of scanning product barcodes with the scanner 54 are input to the host computer 10. The host computer 10 gets the input data related to product sales based on the information input from the keyboard 52 and scanner 54.

The host computer 10 sends the acquired input information to the POS server (not shown). Based on the input information sent from the host computer 10, the POS server (not shown) retrieves information related to product codes, product names, and price from the product master, and sends the acquired information to the host computer 10. Based on the information received from the POS server, the host computer 10 controls the host computer 10 to output a receipt or ticket.

The host computer 10 also displays the information sent from the POS server or information generated based on the sent information on the display 51. By displaying this information on the display 51, the POS system 1 displays the price and other information about the purchased products for the customer. The cash drawer 55, which holds cash received in conjunction with product sales, opens and closes for each sales transaction as controlled by the host computer 10.

The host computer 10 runs, for example, the Windows® operating system 12 based on the .NET Framework supplied by Microsoft®. The POS application program 11 and OPOS (OLE for Retail POS) driver 20 also operate under the operating system 12.

The OPOS driver 20 is a printer driver conforming to the OLE for Retail POS standard (referred to below as an OPOS driver). The OPOS driver 20 operates under the operating system 12 and controls different devices. The OPOS driver 20 is actually incorporated in the operating system 12, and can be thought of as complementing the functions of the operating system 12.

In this embodiment of the invention, the POS system 1 described as one application of the invention is a POS system conforming to the OPOS standard (an OPOS system below).

An OPOS system is described briefly next. An OPOS system provides a POS application program with an object-oriented control system conforming to the OPOS standard. This object-oriented control system includes control objects for individual device classes such as printers, and service objects. An object-oriented control system provides an interface configured for the application program and device-independent interfaces to peripheral devices such as printers. When an application program calls a method defined for a particular device class, the control object calls a service object method. This method is called through an interface that is independent of the device type (such as through the Microsoft® IDispatch interface). The service object executes the request using a device driver provided by the operating system for each device. The result of executing the request is reported to the application program as an event through the control object.

Detailed specifications are defined for each class of peripheral device, and control objects are constructed according to the OPOS (OLE for Retail POS) standard. Service objects, however, are developed by the device manufacturer based on individual device specifications.

The OPOS driver 20 according to this embodiment of the invention is an object-oriented control system as described above. The OPOS driver 20 provides the POS application program 11 with a device-independent interface to different devices including a printer 60, scanner 54, and cash drawer 55. The OPOS driver 20 is composed of control objects (CO) and service objects (SO) corresponding to the specifications of each type of device. An OPOS driver 20 control object is written to conform to the OPOS standard, and is provided with the operating system 12 as part of the POS system platform.

An OPOS driver 20 service object is developed and written for each specific printer 60, scanner 54, cash drawer 55, or other device. Service objects are typically provided by the device manufacturer. The functions of each service object differ according to the different functions and specifications of the individual devices, and provide control matching the characteristics of the particular device. For example, the printer CO 21 provides the POS application program 11 with a common interface for devices belonging to the device category of printers according to the classification system of the operating system 12. The printer CO 21 (first object) calls a printer SO 22 method based on the data output by the POS application program 11 using a method conforming to the OPOS standard. The printer SO 22 (second object) is written for a specific model of printer 60. The printer SO 22 executes a particular process when a method is called by the printer CO 21 to control the printer 60, and reports the result of the process as an event to the printer CO 21.

The OPOS driver 20 also includes a scanner CO 25 for the scanner 54 device category, and a scanner SO 26 corresponding to the model of scanner 54. The scanner CO 25 and scanner SO 26 enable controlling the scanner 54 and scanning barcodes. The OPOS driver 20 also includes a cash drawer CO 27 for the cash drawer 55 device category, and a cash drawer SO 28 for the model of cash drawer 55. The cash drawer CO 27 and cash drawer SO 28 enable opening and closing the cash drawer 55. The display 51 and keyboard 52 can also be controlled by the POS application program 11 using the device drivers provided by the operating system 12.

The host computer 10 may also have a card reader as another input device for reading magnetic information recorded on card media such as credit cards. In this case, the OPOS driver 20 also has a control object for the card reader device category, and a service object for the model of card reader.

Figure 2:
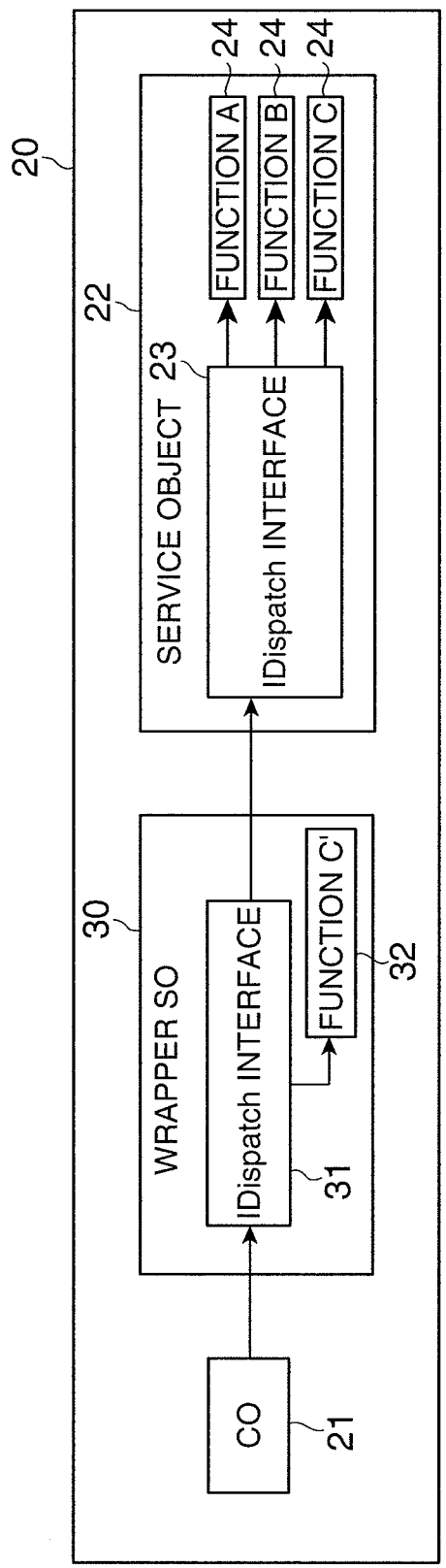
FIG. 2 shows the configuration of an OPOS driver according to a preferred embodiment of the invention.

FIG. 2 describes the conceptual configuration of the OPOS driver 20 in detail. FIG. 2 shows the functions of the OPOS driver 20 related to controlling a printer 60 as an example.

As shown in FIG. 2, the printer SO 22 provides the IDispatch interface 23 as an interface for calling methods and getting data from the printer CO 21. The processes related to printer 60 control provided by the printer SO 22 are grouped by process type (function), and the printer SO 22 has a method 24 for each function. The printer SO 22 also has an IDispatch (Idispatch) interface 23 for each method 24. The IDispatch interface is an interface provided by Microsoft® for communication between objects. For example, in order for the printer CO 21 to execute function B of the printer SO 22, the printer CO 21 calls the method 24 of function B through the IDispatch interface 23 corresponding to that method 24, and the called method 24 is executed.

The printer SO 22 has methods 24 for the different functions of the printer 60. The printer SO 22 therefore becomes more complex as the functions and settings of the printer 60 increase. Service objects for common thermal printers that have more than 100 methods are not uncommon, for example.

When new models of printers are developed or the specifications of an existing model are changed, a printer SO 22 must therefore be developed to match the specifications of the new model or the modified specifications of the existing model. This can also be achieved by modifying an existing printer SO 22 by changing or adding some functions instead of developing a completely new printer SO 22. As described above, however, a printer SO 22 typically has numerous functions and compatibility between the configuration of the IDispatch interface 23 and the functions of the printer SO 22 must be maintained, and accomplishing this is not simple.

The printer CO 21, however, is common to the device category as described above, and a new printer CO 21 is not usually developed every time a new model of printer is developed or the specifications of an existing model are changed.

The OPOS driver 20 in this embodiment of the invention therefore has a wrapper SO 30 (third object) in addition to the printer CO 21 and printer SO 22, and the configuration of this wrapper SO 30 complements the function of the printer SO 22.

The wrapper SO 30 resides between the printer CO 21 and printer SO 22, and more specifically between the printer CO 21 and IDispatch interface 23. The wrapper SO 30 detects when a method is called from the printer CO 21 and the IDispatch interface 23 provided by the printer SO 22 is called. The wrapper SO 30 provides the printer CO 21 with an IDispatch interface 31 that is recognized identically to the IDispatch interface 23. When the printer CO 21 calls a printer SO 22 method, the wrapper SO 30 is called through the IDispatch interface 31 instead of the method 24 being called through the IDispatch interface 23.

The wrapper SO 30 has a method 32 related to specific functions. This method 32 is for functions not provided by the printer SO 22, or to improved, expanded, or modified functions of the printer SO 22. More specifically, instead of modifying the printer SO 22 to provide a new function, a wrapper SO 30 is provided with a method 32 providing the new function.

When the wrapper SO 30 is called from the printer CO 21 through the IDispatch interface 31, the printer CO 21 determines what type of function was called. Based on this decision, the wrapper SO 30 determines whether to execute a method 32 of the wrapper SO 30, or to call a method 24 of the printer SO 22. If the function called by the printer CO 21 is a function belonging to a method 24 of the printer SO 22, the method 24 of the printer SO 22 is executed. In this case, the wrapper SO 30 calls the IDispatch interface 23 instead of the printer CO 21. This call is the same as a call by the printer CO 21 through the IDispatch interface 23. This call causes the method 24 of the printer SO 22 to execute and the printer SO 22 to report (return) the event of the process result. When the wrapper SO 30 detects the event returned by the printer SO 22, the wrapper SO 30 passes the event to the printer CO 21 through the IDispatch interface 31. In this case the printer SO 22 operates as though a function was called by the printer CO 21, and the printer CO 21 operates in the same way as when an event is returned from the printer SO 22. However, if the function called by the printer CO 21 is a function that does not correspond to a method 24 of the printer SO 22, the printer SO 22 cannot execute the function. As a result, the wrapper SO 30 executes the process by means of the method 32 called by the printer CO 21. The wrapper SO 30 does not call the IDispatch interface 23. The wrapper SO 30 has a function that executes a method 32 of the wrapper SO 30 and returns the result as an event to the printer CO 21. The event is returned to the printer CO 21 in the same way as when the printer CO 21 calls the printer SO 22 and executes a method 24. As a result, the printer CO 21 executes operations (called processes) in the same way regardless of whether the executed method is method 24 or method 32.

The wrapper SO 30 thus has functions that should not be executed by the printer SO 22 or functions (method 32) that cannot be executed by the printer SO 22, and executes a method 32 instead of the printer SO 22 when such functions are called by the printer CO 21. The OPOS driver 20 can therefore execute more functions than the printer SO 22 is compatible with out modifying the printer SO 22. More specifically, printer SO 22 functions can be actually added, expanded, and modified by using the wrapper SO 30. The wrapper SO 30 includes a IDispatch interface 31, and from the perspective of the printer CO 21 functions as part of the printer SO 22. As a result, incorporating a wrapper SO 30 enables adding, extending, and modifying functions without changing or modifying the specifications of the printer CO 21 or printer SO 22.

Figure 3A:
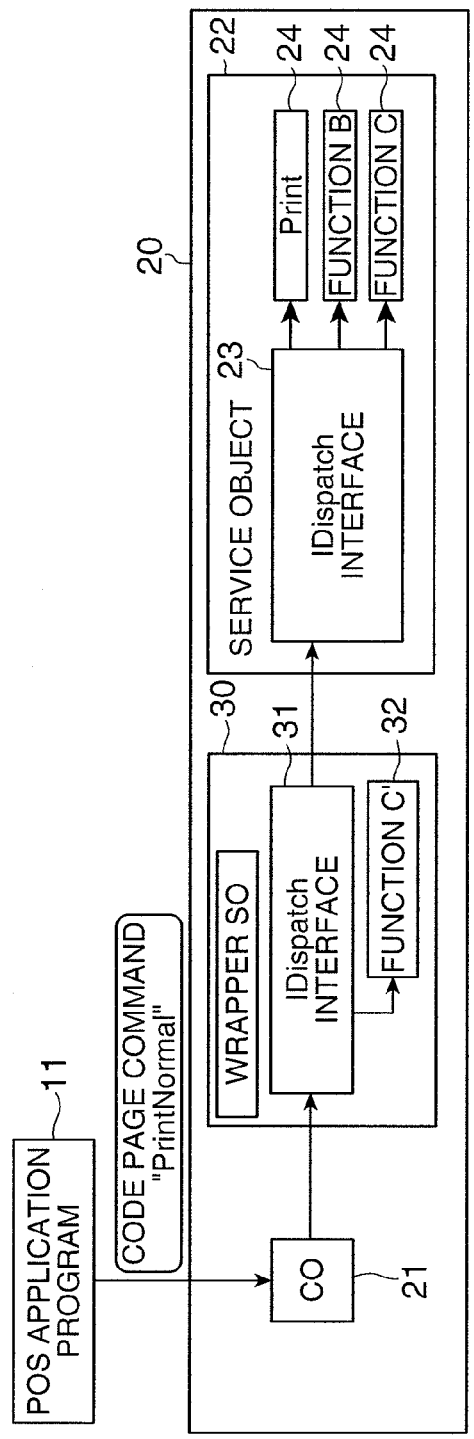
FIG. 3A describes an example of operation when a wrapper SO 30 calls a printer SO 22 method.
Figure 3B:
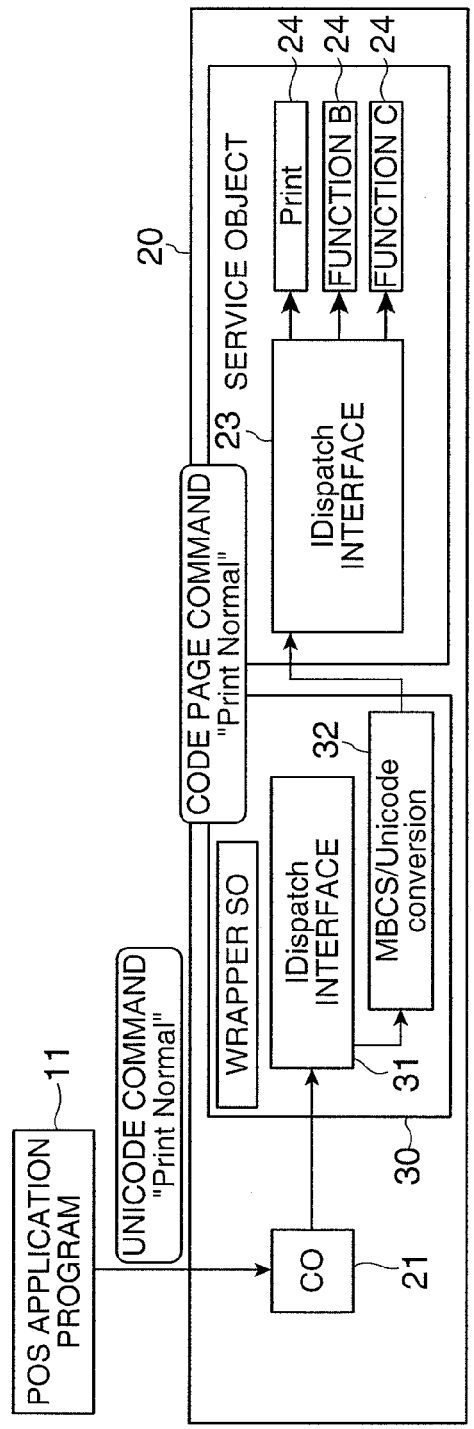
FIG. 3B describes an example of operation when a method of the wrapper SO 30 is called.

FIG. 3 describes a specific example of OPOS driver 20 operation. FIG. 3A describes operation when the wrapper SO 30 calls a printer SO 22 method. FIG. 3B describes operation when a method of the wrapper SO 30 is called.

In the example shown in FIG. 3A, the POS application program 11 first calls the PrintNormal method by outputting a character (character code) on a specified code page (character code set) used by the printer 2 (FIG. 5) to the OPOS driver 20. In response to this call, the printer CO 21 calls the PrintNormal method of the printer SO 22. The character data output by the POS application program 11 is a character code, and is information specifying a particular character in the font data built into the printer 60. Because this data is information specifying font data in the printer 60 using a character code on a specified code page, the printer 60 can read and print the font data based on the input character code. The PrintNormal method has a function that specifies font data built into the printer 60, and selects and sends to the printer 60 a character code on the code page specified by a command. More specifically, in this case the printer SO 22 can execute the PrintNormal method called by the printer CO 21 with method 24, and the wrapper SO 30 can determine that the printer SO 22 can execute the PrintNormal method called by the printer CO 21. The wrapper SO 30 therefore calls and executes the PrintNormal method of the printer SO 22 through the IDispatch interface 23. As a result, the printer SO 22 controls the printer 60 to print. When the character code is sent to the printer 60, the printer SO 22 sends information indicating that the printing process ended to the printer CO 21.

In the example in FIG. 3B, the POS application program 11 outputs data (a character code) specifying a character in Unicode, which is a single character code set, and calls the PrintNormal method. In response to this call, the printer CO 21 calls the PrintNormal method of the printer SO 22. Because the printer 60 in this example is not compatible with data that specifies characters in Unicode, the printer SO 22 written according to the specifications of the printer 60 is also not compatible with data that specifies characters in the Unicode character set. As a result, the printer 60 cannot be used to print even if the method 24 is called using this data. The wrapper SO 30 therefore determines in this case that this call cannot be executed by the printer SO 22. The wrapper SO 30 therefore calls a method 32 of the wrapper SO 30 that performs a MBCS (MultiByte Character Set)/Unicode conversion process. By executing this called method 32, the wrapper SO 30 converts the Unicode data (code point) output by the POS application program 11 to character data compatible with the printer 60 (a character code in a character code set used by the printer 60).

Note that English numbers and letters are specified in this printer 60 with 1-byte character codes, and Japanese kanji, for example, are specified with 2-byte character codes (multibyte character codes). When a character code for a kanji character is input in Unicode, the method 32 converts the input Unicode kanji code to a character code set specifying kanji and a multibyte character code in that character code set so that the character can be printed by the printer 60. Based on the multibyte character code data produced by this conversion process, the wrapper SO 30 calls the PrintNormal method of the printer SO 22 through the IDispatch interface 23. This PrintNormal method sends character codes that the printer 60 can handle. Because the printer SO 22 executes the called PrintNormal method 24, the printer 60 prints as controlled by the printer SO 22. More specifically, character codes for Unicode kanji characters output by the POS application program 11 are converted to kanji character codes that the printer 60 can understand, and can be printed by specifying kanji font data built into the printer 60. This process is also not limited to converting kanji characters, and other characters can be similarly converted and printed.

Figure 4:
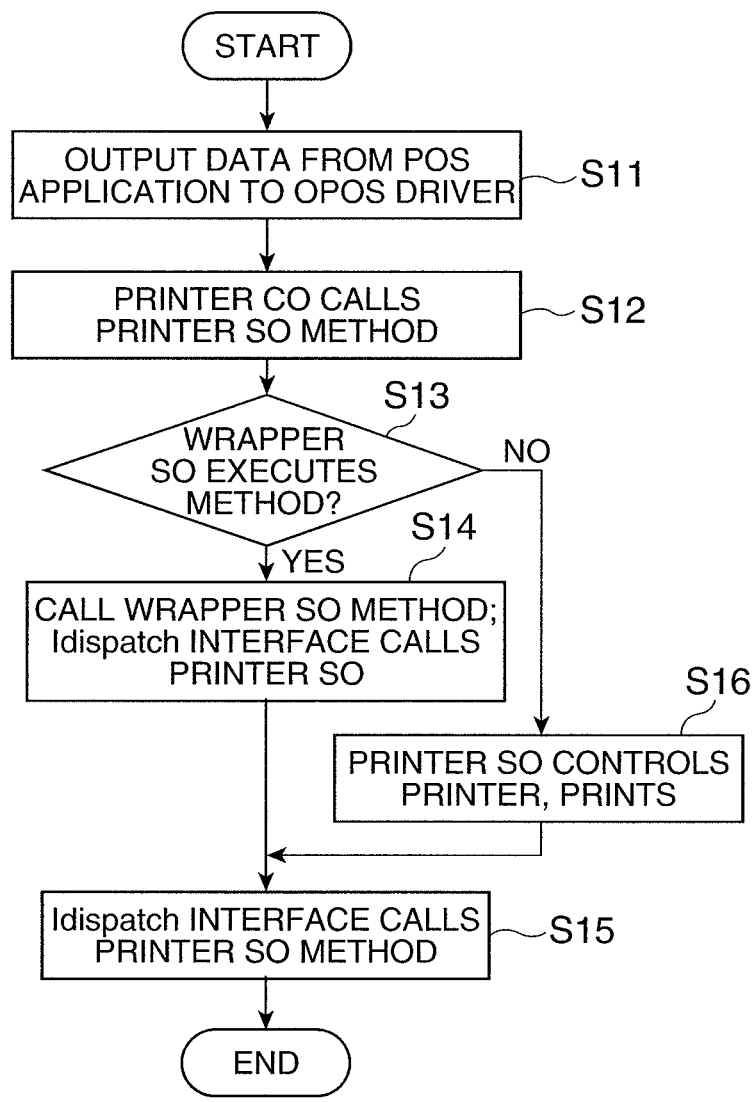
FIG. 4 is a flow chart of POS system operation.

FIG. 4 is a flow chart of POS system 1 operation.

The basic operation of the POS system 1 is described below with reference to FIG. 4. First, the POS application program 11 outputs the data to be printed (character codes) to the OPOS driver 20 (step S11). As a result, the printer CO 21 in the OPOS driver 20 calls the PrintNormal method (step S12).

The wrapper SO 30 determines if the character code output by the POS application program 11 is compatible with the printer 60, and determines whether to call a printer SO 22 method 24 or a wrapper SO 30 method 32 (step S13). If, for example, a character code indicating a kanji character in Unicode is input and the wrapper SO 30 determines to execute method 32 (step S13 returns Yes), the wrapper SO 30 calls the method 32 and executes the process converting the Unicode kanji code to a character code compatible with the printer 60, and then calls the printer SO 22 method 24 based on the data (character code) output from the conversion process (step S14).

If a character code compatible with the printer 60 is input and the method 32 is not executed (step S13 returns No), the wrapper SO 30 calls the printer SO 22 method 24 through the IDispatch interface 23 (step S16).

The printer SO 22 method 24 is then executed to specify character codes compatible with the printer 60 and control the printer 60 to read font data built into the printer 60 and print (step S15). The printer SO 22 then returns an event indicating that printing completed normally to the wrapper SO 30, the wrapper SO 30 passes the event to the printer CO 21, and the process ends.

The POS system 1 according to the first embodiment of the invention described above has a printer CO 21 that provides an interface for different types of devices to a POS application program 11 capable of controlling plural types of devices including printers 60, a printer SO 22 that provides an IDispatch interface 23 for each type of device to the printer CO 21 and processes by device unit, and a wrapper SO 30, and a host computer 10 that executes these objects under an operating system 12. When some of the methods that can be called by the printer CO 21 are called by the printer CO 21, the wrapper SO 30 executes the processes instead of the printer SO 22 and then calls a printer SO 22 method 24 based on the result of the executed process. When the printer CO 21 calls other methods, the wrapper SO 30 calls a printer SO 22 method 24. As a result, when there is an incompatibility between some methods 24 of the printer SO 22 and a specific device, the wrapper SO 30 can be used to compensate for the missing functions and the printer SO 22 can be used to control the device. The functions of the printer SO 22 can therefore be easily modified or extended. Creating a completely new printer SO 22 is therefore not necessary when device specifications change or a new model is developed, for example, software assets such as existing printer service objects 22 can be used, and the work needed to develop new objects can be reduced.

The wrapper SO 30 resides between the interface provided by the printer SO 22 and the printer CO 21, executes methods called by the printer CO 21, and calls printer SO 22 methods through the interface. As a result, printer SO 22 functions can be complemented by the wrapper SO 30 without affecting the configuration of the printer SO 22 and printer CO 21.

The printer CO 21 is a control object that is provided for each type of personal computer device, and the printer SO 22 is a service object provided for each specific device. As a result, when the specifications of existing devices are changed or a new model of device is developed, existing service object assets can be used to complement the functions of the service object provided for each specific device while assuring compatibility with the control object corresponding to the type of device.

The printer CO 21 and printer SO 22 are constructed as objects that control a printer 60 as requested by the POS application program 11. When a print method for a particular character code set is called by the printer CO 21, a method 32 of the wrapper SO 30 converts the particular character code set to another character code set, and then calls a print method of the printer SO 22 based on the character code set output by the conversion process. As a result, a character code conversion function can be added by the wrapper SO 30 when the printer SO 22 does not have an appropriate character code conversion function, and data in a character code set with which the printer SO 22 is not compatible can be processed.

The printer CO 21 is an OPOS standard control object, the printer SO 22 provides an IDispatch interface to the printer CO 21, and the wrapper SO 30 provides an IDispatch interface to the printer CO 21 and calls printer SO 22 methods through the IDispatch interface of the printer SO 22. As a result, the functions of an OPOS standard printer SO 22 can be complemented without affecting the OPOS standard printer CO 21.

Embodiment 2

A second embodiment of the invention is described next.

Figure 5:
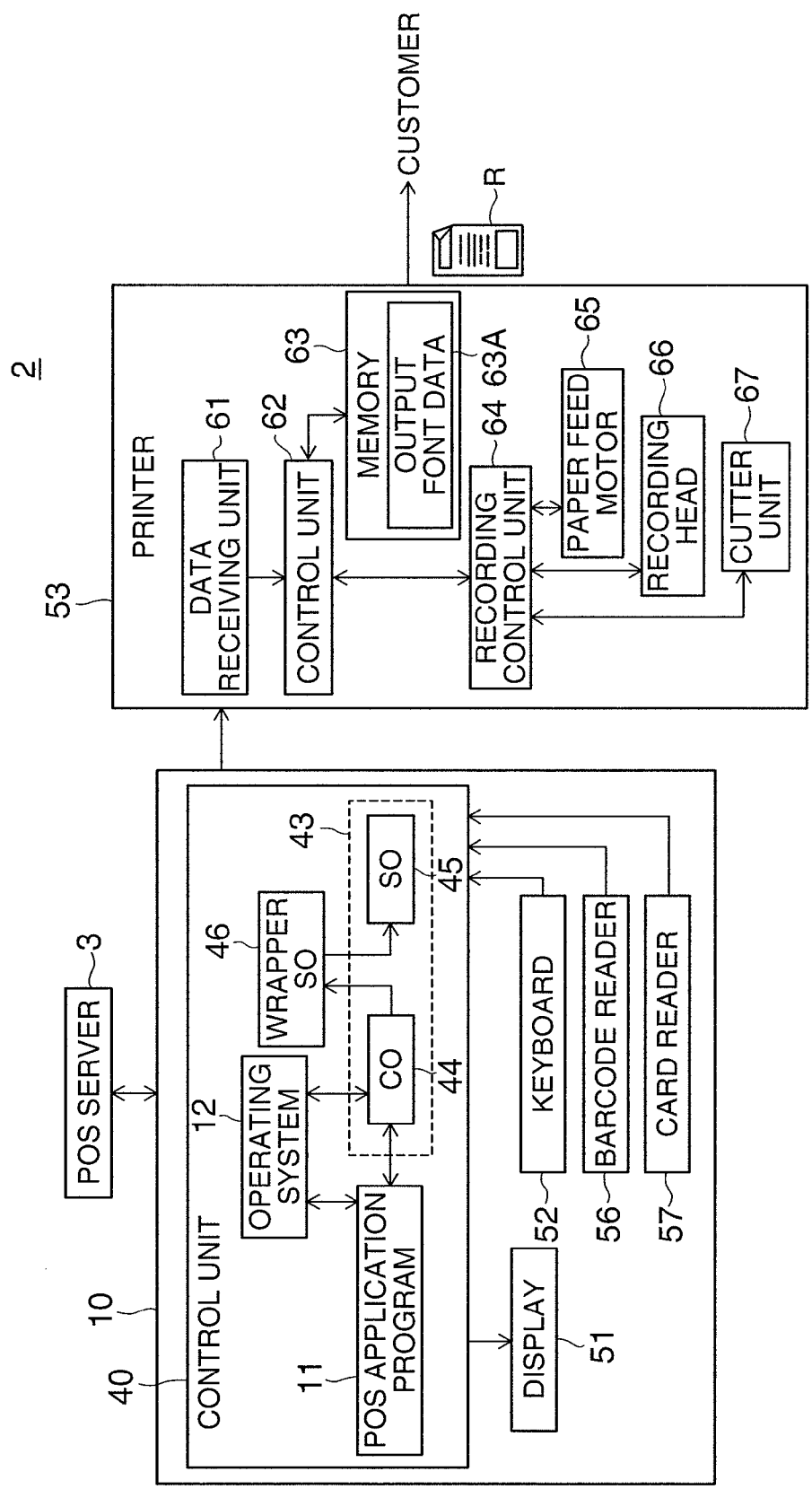
FIG. 5 is a block diagram showing the functional configuration of a POS system according to an embodiment of the invention.

FIG. 5 is a block diagram showing the functional configuration of a POS system 2 according to a second embodiment of the invention.

This second embodiment describes a specific example of printing a receipt R with a printer 60 in a POS system 2 that is configured identically to the POS system 1 described in the first embodiment. In this second embodiment the host computer 10 functions as a control device and the printer 60 is a device and an output device. Note that FIG. 5 also shows the POS server 3, which is not shown in the figure of the first embodiment.

The POS server 3 has a control unit including a CPU, ROM, and RAM. The POS server 3 processes information stored in a buffer in RAM as a result of the CPU executing a control program stored in ROM. More specifically, the POS server 3 extracts product code, product name, and price related information from a product master based on input information sent by the host computer 10, and generates and sends product data to the host computer 10.

The host computer 10 is configured the same as in the first embodiment, and additionally has a card reader 57 that reads magnetic information recorded on a card-type recording medium. The host computer 10 reads a customer credit card or member card with the card reader 57 to acquire the information needed to process credit card payments or member information such as a membership number.

The host computer 10 has a control unit 40 including a CPU, ROM, and RAM, and the control unit 40 controls the printer 60 through an OPOS standard printer driver 43 that runs under the operating system 12.

The printer driver 43 is an example of a OPOS driver 20 described above. The printer driver 43 includes a control object 44 (common control means, host driver) for the printer device category, and a service object 45 (character data generating means, client driver) specific to the model of printer 60. The control object 44 is an example of a printer CO 21, and the service object 45 is an example of a printer SO 22. The control unit 40 runs the operating system 12, and controls outputting receipts R from the printer 60 through functions of the printer driver 43 and the POS application program 11 operating under the operating system 12. The printer driver 43 is supplied to the user as a single package combining the control object 44 and service object 45.

The POS application program 11 generates data including character codes for printing a receipt based on input information and the product data sent from the POS server 3, and this data is passed through the operating system 12 to the control object 44 for the printer, and from the control object 44 to the service object 45 specific to the printer 60 model. The service object 45 processes the data, and generates and sends to the printer 60 print data including character data and commands in the command language of the printer 60.

The printer 60 is a receipt printer with a thermal head. The printer 60 has a data receiving unit 61 that receives commands and print data from the host computer 10. The printer 60 also has a control unit 62 including a CPU, ROM, and RAM that controls other parts of the printer 60. The printer 60 also has memory 63 that stores programs executed by the control unit 62 and processed data, and a recording control unit 64 that drives a paper feed motor 65, recording head 66, and cutter unit 67 as controlled by the control unit 62.

The printer 60 receives commands and print data from the host computer 10 through the data receiving unit 61, and temporarily stores the received commands and print data in a receive buffer (not shown in the figure) of the data receiving unit 61. The control unit 62 reads and interprets the commands and print data in the receive buffer. Based on the print data, the control unit 62 references output font data 63A (character code set) previously stored in memory 63, and gets the font data for the characters (font pattern information) corresponding to the character codes contained in the print data. The control unit 62 then arranges the characters and images in the receipt R to be printed, produces and temporarily stores image data for printing a receipt R containing the font data, and outputs the image data to the recording control unit 64.

The recording control unit 64 controls the paper feed motor 65 based on the image data stored in RAM. The recording control unit 64 also sequentially sends the image data to the recording head 66 while conveying the thermal roll paper with the paper feed motor 65. The recording control unit 64 controls energizing the recording head 66 and driving the recording head 66 to print on the thermal roll paper. The recording control unit 64 thus prints by this sequence of operations. When printing the receipt R on one page ends, the recording control unit 64 drives the cutter unit 67 to cut the thermal roll paper and discharges the receipt R.

Figure 6:
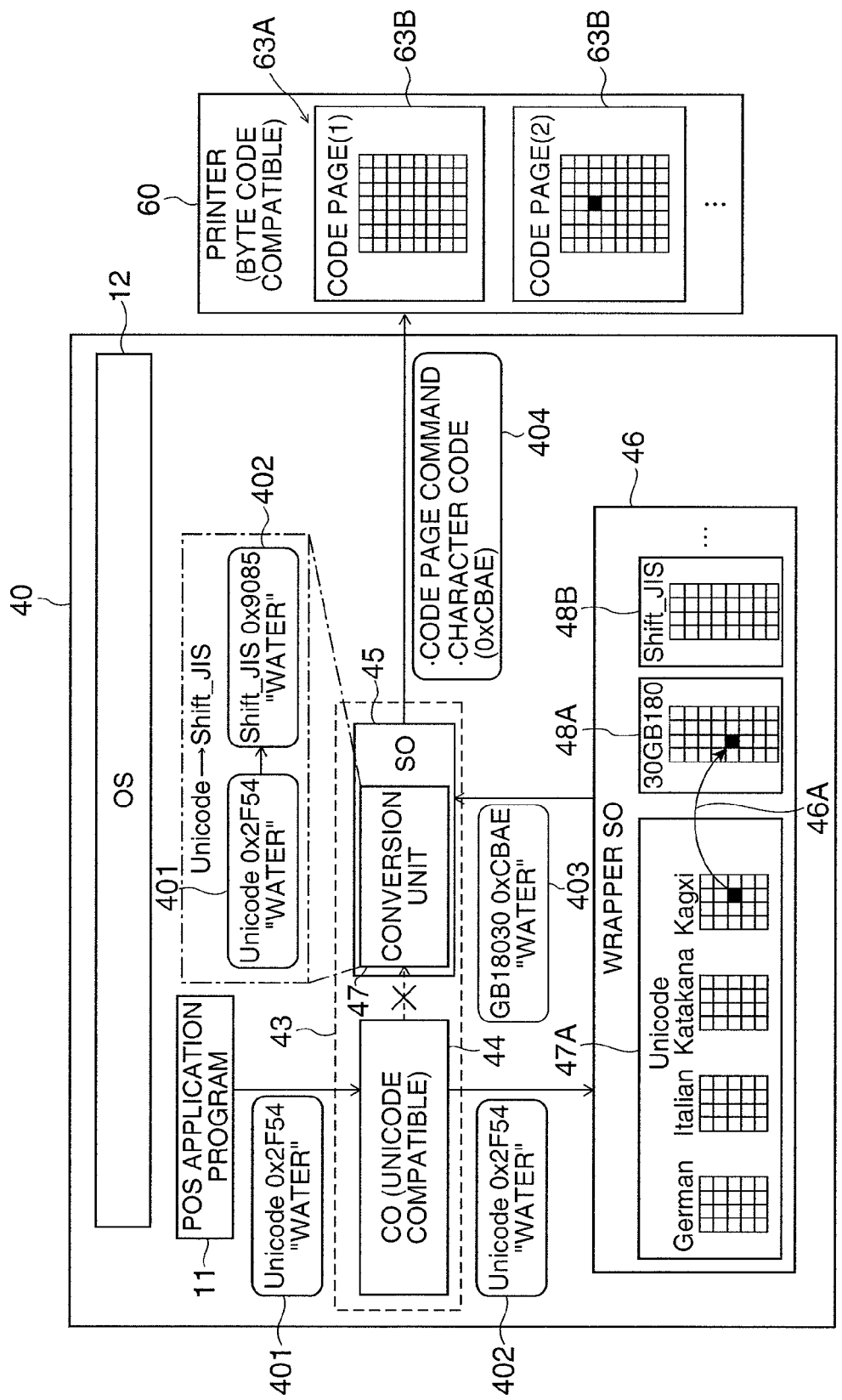
FIG. 6 is a block diagram showing the detailed configuration of the host computer.

FIG. 6 is a block diagram showing the configuration of the host computer 10 in detail, and more particularly shows the software configuration of the control unit 40.

In this second embodiment the operating system 12 uses Unicode, which is a universal character code set. Unicode is a single large character code set that includes a plurality of character code sets covering multiple languages. As a result, the operating system 12 can output character codes created using Unicode (such as character codes including the including the Unicode Basic Latin code set and the Japanese katakana code set). The POS application program 11 is compatible with the operating system 12. As a result, the POS application program 11 conforms to the Unicode character code system. The operating system 12 and the POS application program 11 can therefore input and output character codes in any Unicode character code set.

The printer driver 43 uses the character code sets for one or a plural number of languages according to the character codes used by the printer 60. The printer driver 43 is only compatible with the character code sets for some of the languages covered by Unicode. This is because memory sufficient to store an extremely large amount of font data is required for compatibility with all Unicode languages, the range of languages used by the user is typically limited and users typically select and purchase printers to match the languages that will be used, and the languages used by the printer driver therefore only need to match the printer specifications. If Unicode is used and a language used by the POS application program 11 is not included in the languages with which the printer 60 is compatible, the functionality of the printer driver 43 must be compensated for.

This second embodiment describes an example in which the user language is set to Japanese in the operating system 12, and the POS application program 11 operates through a Japanese language user interface. In this scenario the printer driver 43 is provided as a Japanese language device driver program. The printer 60 used in this second embodiment, however, is compatible with Chinese, and is configured to print characters in the Chinese (Simplified Chinese) script. More specifically, the printer 60 is not compatible with Japanese.

The printer driver 43 can also be configured to be compatible with plural printer models. For example, a plurality of printers 60 that have a common mechanical configuration but are compatible with different printers can be controlled with a single printer driver 43. As described above, however, the language used by the printer driver 43 must be made to match the language used by the printer 60.

This is described more specifically below. When the POS application program 11 asserts a print command and calls the printer driver 43, the control object 44 generates data including character codes for printing the characters in the receipt data output by the POS application program 11. These character codes specify specific characters in a specific character block in Unicode. In the example in FIG. 6 the data 401 output by the POS application program 11 includes the 2-byte character code 0x2F54 denoting the Japanese kanji for "water." Based on this data, the control object 44 generates the output data 402 including the Unicode character code 0x2F54.

The service object 45 is specific to the printer 60 or a plurality of printers including the printer 60. The service object 45 includes a conversion unit 47 (conversion processing means) that converts output data 402 output by the control object 44. An example of a conversion unit 47 is the Microsoft Foundation Class (MFC) published by Microsoft®. The function of the conversion unit 47 is to convert character codes contained in the output data 402 to character codes compatible with the service object 45. The service object 45 uses a character code set that is compatible with one language or fewer plural languages than Unicode. More specifically, the printer driver 43 includes an OPOS standard, Unicode-compatible control object 44, and a service object 45 that is compatible with one or a few languages specific to a plurality of printers including printer 60. As a result, the printer driver 43 is compatible with Unicode characters output by the POS application program 11, and with a printer 60 that is not compatible with Unicode.

The service object 45 according to this embodiment of the invention is compatible with Japanese, which is the language of the operating system 12. The service object 45 uses 2-byte character codes such as the Shift-JIS code set. The conversion unit 47 therefore converts character codes in the Unicode character set (such as 0x2F54 in the example in FIG. 6) to character codes denoting the same characters in Shift-JIS.

The service object 45 converts Shift-JIS character codes converted by the conversion unit 47 to character data 404 corresponding to the output font data 63A of the printer 60. If the printer 60 is designed for Japanese and the built-in output font data 63A is Shift-JIS, the correct characters can be printed. However, if the printer 60 is designed for a language other than Japanese, the printer 60 cannot process Shift-JIS character codes. As a result, the printer 60 cannot print if incompatible character codes are received, or will print the wrong characters. In other words, a problem occurs if the language used by the operating system 12 and the language used by the printer 60 are different.

The output font data 63A is composed of plural different font groups. One font group is a character set such as the ASCII Code set. Plural storage areas (such as 255 pages from 1 to 255) called code pages 63B for storing these font groups are provided in memory 63 (see FIG. 5). Plural fonts are stored on each code page 63B. A "font" as used here is data (font data, font pattern information) that is output to the recording control unit 64 and describes the shape of a particular character when recorded by the recording head.

A command specifying the number of a single specific code page 63B amongst the plural code pages 63B constituting the output font data 63A, and data (a character code) specifying a single character on that code page 63B, can be input to the printer 60. The control unit 62 then extracts a single font based on this command data. This font is a character that is actually printed on the receipt R.

In order to extract a character denoted by a character code converted by the conversion unit 47 from the output font data 63A, the service object 45 generates character data 404 including information specifying a code page 63B (such as a command specifying the number of the code page 63B) and information (a character code) specifying a character on that code page 63B, and outputs this character data 404 to the printer 60. If plural characters on the code page 63B of the same number are used, the information specifying the code page 63B can be omitted.

The printer 60 described in this embodiment is for printing Chinese (Simplified Chinese), for example. More specifically, the printer 60 stores a font group corresponding to the Chinese GB18030 character code set as the output font data 63A. The service object 45 must therefore convert the Unicode code point 0x2F54 contained in the output data 402 generated by the control object 44 to the corresponding character code in the GB18030 code set. The function of the conversion unit 47, however, is to convert to the Japanese Shift-JIS code set. As a result, the service object 45 cannot convert character codes from Unicode to GB18030.

The control unit 40 in this embodiment of the invention therefore uses a wrapper SO 46 (character code conversion means), which is another example of the wrapper SO 30 described above. The wrapper SO 46 converts the Unicode character codes contained in the output data 402 output by the control object 44 to character codes in the GB18030 character code set contained in the output font data 63A stored in the printer 60. The output data 402 generated by the control object 44 is converted by the wrapper SO 46 to output data 403, which is the corresponding character code 0xCBAE in the GB18030 code set. The converted output data 403 is passed to the service object 45 without going through the conversion unit 47. More specifically, the control object 44 is prohibited from passing output data 403 directly to the service object 45, and this path is blocked (denoted by an x in FIG. 6).

Which languages the printer 60 is compatible with can be known by the printer driver 43 getting an ID number from the printer 60. The printer driver 43 stores a lookup table correlating ID numbers to the languages used by the printer.

The conversion unit 47 and service object 45 may also be combined in a single package with all data input to the service object 45 passing through the conversion unit 47. In this case the wrapper SO 46 must be configured to not be affected by the conversion unit 47. More specifically, the wrapper SO 46 preprocesses the character code 0xCBAE by bit unit to a data format that is not affected by passing through the conversion unit 47. This data passes the conversion unit 47 without being converted in any way. The service object 45 then applies a binary conversion to the data that passed the conversion unit 47 to restore the character code 0xCBAE.

The wrapper SO 46 internally stores conversion data 46A that defines the correlation between the Unicode character code set 47A and a plurality of other character code sets 48A, 48B. The conversion data 46A does not need to contain the actual character data, but may also include the character data.

The conversion data 46A is data for converting character codes specifying the same character between different character code sets. The conversion data 46A can be used to convert each character code in one character code set 47A to a character code in another character code set 48A, 48B specifying the same character as the character identified by the character code in the one character code set 47A. For example, the wrapper SO 46 converts the character code 0x2F54 for the kanji "water" in Unicode to the character code 0xCBAE for the same "water" character in Chinese in the GB 18030 code set 48A according to the conversion data 46A. The wrapper SO 46 may be compatible with any desired number and type of character code sets 47A, 48A, 48B. For example, the wrapper SO 46 may have conversion data 46A defining correlations between a large number of character code sets. The combination of character code sets used as the source and target can also be set by the user using a user interface for configuring the printer driver 43.

The service object 45 can thus identify the correct character in the GB18030 character code set used by the printer 60, and can generate and send character data 404 including the code page 63B containing the corresponding character font (font data) and the character code specifying a particular character on that code page 63B.

The service object 45 can therefore be made compatible with a printer 60 that uses an incompatible character code set without greatly modifying the printer driver 43. As a result, the output data 402 can be converted to character data 404 for a printer 60 that uses a different character code set. Unicode text output by the POS application program 11 can therefore be printed by a printer 60 that is incompatible with Unicode.

Figure 7:
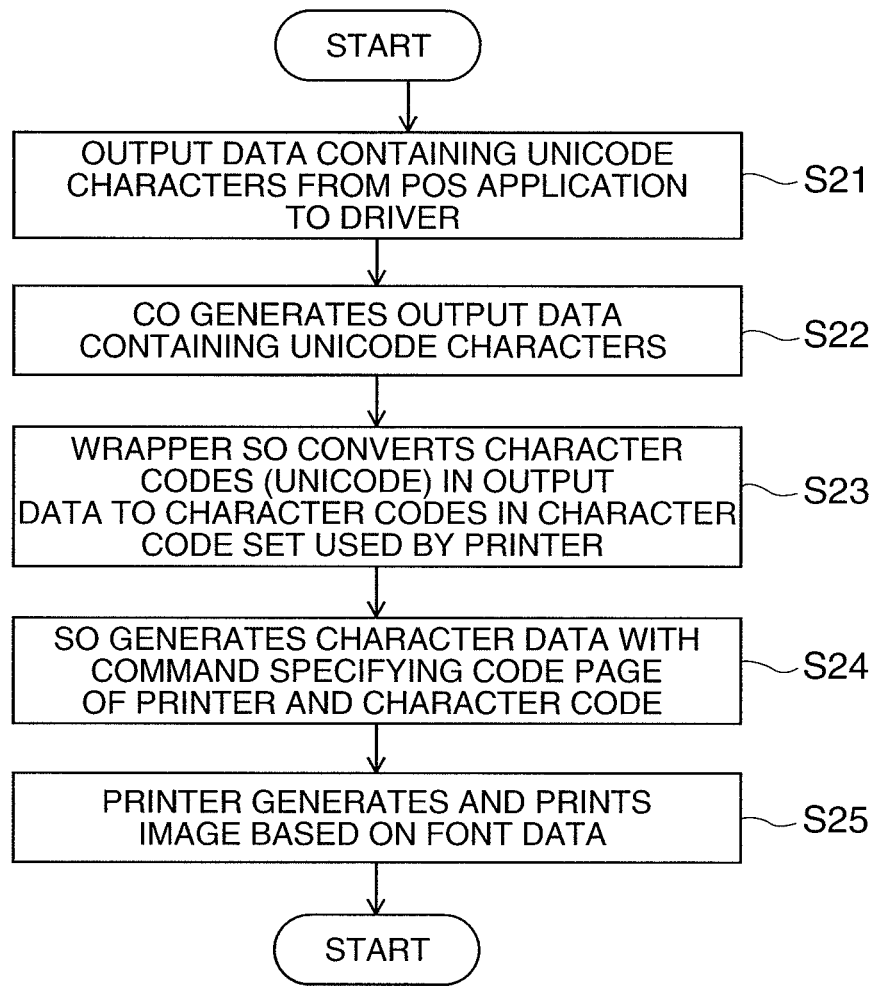
FIG. 7 is a flow chart of host computer operations

FIG. 7 is a flow chart of the operation of the host computer 10 described above.

The POS application program 11 first outputs data containing Unicode character codes to the printer driver 43 (step S21). Based on this data, the control object 44 then generates output data containing the Unicode character codes (step S22).

The wrapper SO 46 then converts the Unicode character codes contained in the output data generated by the control object 44 to character codes in the character code set used by the printer 60 (step S23). Next, based on the output data containing the converted character codes, the service object 45 generates character data 404 containing information specifying the code page 63B corresponding to the output font data 63A and the character codes (step S24). The service object 45 then outputs the generated character data 404 to the printer 60. The printer 60 then reads the font data for the character codes from the specified code page 63B, and prints (step S25).

As described above, the host computer 10 in a POS system 2 according to the second embodiment of the invention has a control object 44 that outputs output data common to a plurality of printers 60 based on data containing Unicode character codes output by the POS application program 11; a service object 45 that generates character data in the output font data 63A stored in the printer 60 based on the Unicode character codes contained in the output data; and a wrapper SO 46 that resides between the control object 44 and the service object 45, and when the output font data 63A stored by the printer 60 is for a character code set other than Unicode, converts the Unicode character codes contained in the output data to character codes in the character code set of the output font data 63A stored by the printer 60, and outputs the converted character codes to the service object 45.

The host computer 10 uses the wrapper SO 46 to convert the Unicode character codes contained in the output data to character codes in the character code set used by the printer 60. The wrapper SO 46 can therefore substitute and output character data that is compatible with the printer 60 for data in a character code set with which the service object 45 of the printer driver 43 is not compatible without greatly modifying the printer driver 43. The need to manage character code sets used by the printer driver 43 and the printer 60 is thus eliminated, and data containing Unicode characters output by the POS application program 11 can be output correctly by a printer 60 that is not Unicode compatible. The utility of a common means of controlling the printer 60 is also not lost. A means that simply converts character codes can also be provided more easily because less data is required than when a means of controlling the printer 60 is provided and the character code sets stored in the printer 60 are increased.

The output font data 63A stored internally by the printer 60 as a character set is specified using character codes on plural code pages and is composed of font data for printing with a recording head 66, and the service object 45 generates and outputs to the printer 60 a character code including a command specifying a particular code page and the desired character code using a Unicode character code or a character code in the character code set corresponding to the output font data 63A. A character code set and character code corresponding to a character code on any of plural code pages stored in the printer 60 are therefore sent to the printer 60. As a result, the printer 60 can print based on internally stored font data.

The service object 45 also has a conversion unit 47 that, based on the language setting of the operating system 12, converts Unicode character codes contained in the output data to character codes in the character code set corresponding to the set language. When the language setting of the operating system 12 and the language of the character set of the printer 60 are the same, the conversion unit 47 can easily convert output data from the POS application program 11 to the character code set of the same language by means of a simple process.

The wrapper SO 46 also passes character codes in character code sets covered by the output font data 63A to the conversion unit 47 as data in a form that is not converted by the conversion unit 47. In this case the service object 45 restores the data output by the wrapper SO 46 to the character codes in the character code set of the output font data 63A. This prevents mistaken conversion by the conversion unit 47.

Furthermore, because the service object 45 corresponds to the language set as the language used by the operating system 12, the service object 45 identifies character codes contained in a specific character code set based on the character codes contained in the output data, and generates data including these character codes for controlling the printer 60. As a result, when a specific character code set used by the service object 45 (such as Shift-JIS in the Japanese language example described above) is not compatible with the output font data 63A stored in the printer 60, the wrapper SO 46 can convert the character codes to the appropriate character code set and character codes and output the correct character data in the character code set used by the printer 60.

Using a wrapper SO 46 that resides between the control object 44 that functions as a host driver and a service object 45 that functions as a client driver, the host computer 10 can output correct character data that is compatible with the printer 60 without losing the utility of a common control object 44 and without modifying the service object 45 specific to each printer 60.

The embodiments described above relate to specific preferred embodiments of the invention, and the invention is obviously not limited thereto. For example, the devices of the POS system 1 in the first embodiment are not limited to a display 51, keyboard 52, printer 60, scanner 54, and cash drawer 55, and the invention can be used with other devices. The invention can also be applied to a configuration in which the host computer 10 controls printing by a plurality of printers 60.

A configuration that provides a wrapper SO 30 to complement the functions of the printer SO 22 that controls the printer 60 is described above, but a wrapper SO could also be provided for the scanner 54 or cash drawer 55 to extend or change the functions of the scanner SO 26 or cash drawer SO 28, for example.

The output device of the POS system 2 in the second embodiment is also not limited to a printer 60, and display devices and other types of output devices can also be used.

The character code sets and languages used in the foregoing embodiments are also for example only, and the operation of the invention described above is not limited to Unicode and can be applied to other character code sets and character code systems.

The invention is described in the foregoing embodiments as applied to a POS system that runs a POS application, but the invention can be applied to any object that provides an interface to any application program that runs under the operating system. More specifically, the application program run by the host computer 10 is not limited to a POS application, and the invention can be applied to configurations that execute other types of application programs and control devices not limited to output devices.

The function units shown in FIG. 1, FIG. 2, FIG. 3A, FIG. 3B, FIG. 5, and FIG. 6 describe functional configurations, the function units do not need to be rendered by independent hardware components, and configurations that render the functions of plural function units in a single hardware component through cooperation between software and hardware components, and configurations that render a single function unit by means of plural hardware components, are obviously also conceivable.

The program executed by the host computer 10 that performs the operation described above is not limited to being stored in a ROM device of the host computer 10, and configurations in which the program is stored in a removable recording medium, downloadably to another device connected through a communication line, or downloadably by the host computer 10 from another device, are also conceivable. Other aspects of the configuration can also be changed as desired.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control device that can execute an application program and control at least one type of device, comprising:
    a first object that provides the application program with a first interface for each type of device, wherein the control device is a point-of-sale (POS) device and the at least one type of device includes a scanner, a printer, or a peripheral device of the control device;
    a second object that provides the first object with a second interface for each type of device, and executes a process by the at least one type of device, wherein the process is executed by a plurality of methods of the second object; and
    a third object that executes the process instead of the second object when a first method from the plurality of methods of the second object is called by the first object, and calls the first method of the second object when a second method from the plurality of methods of the second object is called by the first object, wherein the third object is a wrapper for the first interface and the second interface, wherein the wrapper provides one or more processes not provided by the plurality of methods of the second object of the at least one type of device, or provides modifications to the plurality of methods of the second object, thereby providing a new process to the plurality of methods.

2. The control device described in claim 1, wherein:
the third object resides between the second interface provided by the second object and the first object, and when the other method is called by the first object calls the method of the second object through the second interface.

3. The control device described in claim 1, wherein:
the first object is a control object that is provided for each type of device; and
the second object is a service object that is provided for each device.

4. The control device described in claim 1, wherein:
the application program is a POS application program;
the at least one device is the printer;
the first object and second object are objects that control the printer according to requests from the POS application program; and
the process executed by the third object converts from a specific character code set to another character code set compatible with the printer when the first object calls a print method of the specific character code set, and calls a print method of the second object based on the character code set resulting from conversion.

5. The control device described in claim 4, wherein:
the specific character code set is written in Unicode, and the other character code set is written with 1-byte or 2-byte character codes.

6. The control device described in claim 1, wherein:
the first object is an OPOS standard control object;
the second object provides an IDispatch interface as the interface to the first object; and
the third object provides an IDispatch interface to the first object and calls a method of the second object through the IDispatch interface of the second object.

7. The control device described in claim 1, wherein:
the devices include an output device that is controlled by the control device;
the first object is a common control means that outputs output data common to plural types of output devices based on data output by the application program;
the second object is a character data generating means that generates character data in a character set stored internally by the output device based on a character code of a specific character code set contained in the output data; and
the third object is a character code conversion means that resides between the common control means and the character data generating means, and when the internal character set of the output device is another character code set that differs from the specific character code set, converts character codes in the specific character code set contained in the output data to character codes in the other character code set, and outputs to the character data generating means.

8. The control device described in claim 7, wherein:
the output device is a printer;
the character set stored internally by the printer is composed of font data that is specified by character codes on a plurality of code pages for printing with a recording head; and
the character data generating means generates and outputs character codes on the appropriate code page to the printer based on character codes in the specific character code set or character codes in the other character code set.

9. The control device described in claim 7, wherein:
the character data generating means has a conversion process means that, based on the language setting of the operating setting, converts character codes in the specific character code set contained in the output data output by the common control means to character codes in the character code set corresponding to the set language.

10. The control device described in claim 9, wherein:
the character code conversion means converts character codes in the other character code set to data in a format that is not converted by the conversion process means, and outputs to the character data generating means; and
the character data generating means executes a process that restores data input from the character code conversion means to character codes in the other character code set.

11. The control device described in claim 7, wherein:
the common control means is a host driver that executes a method called by the application program, processes data output from the application program, and generates data containing a character code in a common character code set and an output command that can be used in common by a plurality of device types; and
the character data generating means is a client driver that generates character data in a character set stored internally by the output device based on character codes in the specific character code set contained in data generated by the host driver.

12. A method of controlling a device with a control device that executes an application program and can control at least one type of device, the control method comprising:
a first step that calls a method based on data output by the application program through a first object that provides the application program with a first interface for each type of device, wherein the control device is a point-of-sale (POS) device and the at least one type of device includes a scanner, a printer, or a peripheral device of the control device;
a second step that executes a process by device unit through a second object that provides the first object with a second interface for each of the at least one type of device, wherein the process is executed by a plurality of methods of the second object; and
a third step that, when a first method from the plurality of methods of the second object is called by the first object, executes the process through a third object instead of the second object, and when a second method from the plurality of methods of the second object is called by the first object, calls the method of the second object through the third object, wherein the third object is a wrapper for the first interface and the second interface, wherein the wrapper provides one or more processes not provided by the plurality of methods of the second object of the at least one type of device, or provides modifications to the plurality of methods of the second object, thereby providing a new process to the plurality of methods.

13. The control method described in claim 12, wherein:

the first step outputs output data common to plural types of devices based on data output by the application program;

the second step generates character data in a character set stored internally by the device based on a character code in a specific character code set contained in the output data; and the third step is a step that resides between the first step and the second step, and when the internal character set of the device is another character code set that differs from the specific character code set, converts a character code in the specific character code set contained in the output data to a character code in the other character code set.

14. A non-transitory storage medium that stores a program causing a computer that can control at least one type of device to execute an object that provides an interface to an application program, the program causing the computer to function as:

a first object that provides the application program with a first interface for each type of device, wherein the control device is a point-of-sale (POS) device and the at least one type of device includes a scanner, a printer, or a peripheral device of the control device;

a second object that provides the first object with a second interface for each type of device, and executes a process by the at least one type of device, wherein the process is executed by a plurality of methods of the second object; and a third object that executes the process instead of the second object and calls a method of the second object based on the result of executing the process when a first method from the plurality of methods of the second object is called by the first object, and calls the first method of the second object when a second method from the plurality of methods of the second object is called by the first object, wherein the third object is a wrapper for the first interface and the second interface, wherein the wrapper provides one or more processes not provided by the plurality of methods of the second object of the at least one type of device, or provides modifications to the plurality of methods of the second object, thereby providing a new process to the plurality of methods.

15. The non-transitory storage medium storing the program described in claim 14, wherein:

the first object outputs output data common to plural types of devices based on data output by the application program;

the second object generates character data in a character set stored internally by the device based on a character code in a specific character code set contained in the output data; and the third object resides between the first object and the second object, and when the internal character set of the device is another character code set that differs from the specific character code set, converts a character code in the specific character code set contained in the output data to a character code in the other character code set, and outputs to the second object.

16. The method of claim 12, wherein a configuration of the wrapper extends the methods of the second object, wherein the configuration is compatible with the first object.

\* \* \* \* \*